(12) United States Patent
Zhou et al.

(10) Patent No.: US 7,782,573 B2
(45) Date of Patent: Aug. 24, 2010

(54) TRELLIS-BASED FEEDBACK REDUCTION FOR MULTIPLE INPUT MULTIPLE OUTPUT ORTHOGONAL FREQUENCY DIVISION MULTIPLEXING (MIMO-OFDM) WITH RATE-LIMITED FEEDBACK

(75) Inventors: Shengli Zhou, Mansfield, CT (US); Baosheng Li, Storrs, CT (US); Peter Willett, Coventry, CT (US)

(73) Assignee: University of Connecticut, Farmington, CT (US)

( * ) Notice: Subject to any disclaimer, the term of this patent is extended or adjusted under 35 U.S.C. 154(b) by 853 days.

(21) Appl. No.: 11/599,830

(22) Filed: Nov. 15, 2006

(65) Prior Publication Data
US 2007/0297529 A1 Dec. 27, 2007

Related U.S. Application Data

(60) Provisional application No. 60/737,815, filed on Nov. 17, 2005.

(51) Int. Cl.
H04K 1/10 (2006.01)
(52) U.S. Cl. .................. 360/260; 375/262; 375/265; 375/341
(58) Field of Classification Search ............ 375/260, 375/262, 265, 341
See application file for complete search history.

(56) References Cited

U.S. PATENT DOCUMENTS

| | | | |
|---|---|---|---|
| 6,741,551 B1 | 5/2004 | Cherubini | |
| 7,590,182 B2 * | 9/2009 | Ling et al. | .................. 375/260 |
| 7,599,419 B2 * | 10/2009 | Jafarkhani et al. | .......... 375/137 |
| 2003/0134607 A1 | 7/2003 | Raghavan et al. | |
| 2005/0052989 A1 | 3/2005 | Tao et al. | |
| 2005/0058095 A1 | 3/2005 | Sadri et al. | |
| 2005/0147176 A1 | 7/2005 | Yun et al. | |
| 2005/0195905 A1 * | 9/2005 | Kowalski | ..................... 375/260 |
| 2007/0155336 A1 * | 7/2007 | Nam et al. | ..................... 455/69 |
| 2007/0280386 A1 * | 12/2007 | Waes et al. | .................. 375/347 |
| 2008/0108310 A1 * | 5/2008 | Tong et al. | ..................... 455/69 |

OTHER PUBLICATIONS

Gersho, "Vector Quantization and Signal Compression," Kluwer Academic Publishers, 1992, pp. xviii and xix and chapter 15 pp. 555, 567-568 this papers is possession of the Applicants, see Shengli Zhou, "Recursive and trellis-based feedback reduction for MIMO-OFDM with transmit beamforming", 2005, IEEE GLOBECOM '05, reference [7].*

(Continued)

*Primary Examiner*—Juan A Torres
(74) *Attorney, Agent, or Firm*—McCarter & English, LLP

(57) ABSTRACT

Trellis-based methods for reducing feedback while maintaining performance in a Multiple Input, Multiple Output Orthogonal Frequency Division Multiplexing (MIMO-OFDM) system. The methods involve: receiving a plurality of symbols from a plurality of sub-carriers at a receiver; selecting a plurality of indices of codewords corresponding to a codebook of pre-coding weighting matrices for the sub-carriers based on vector quantization compression of the codewords, including selecting a plurality of indices based on trellis-based feedback encoding; and transmitting the selected indices over a wireless channel to a transmitter. Optimal precoding matrices are selected at the same time for all subcarriers by searching for the optimum choice of matrices along a trellis. Selecting a plurality of indices based on trellis-based feedback encoding includes constructing a trellis by specifying a state transition table.

15 Claims, 9 Drawing Sheets

OTHER PUBLICATIONS

Mielczarek, "Flexible channel feedback quantization in multiple antenna systems", 2005 IEEE 61st Vehicular Technology Conference, 2005, VTC 2005-Spring, vol. 1, May 30-Jun. 1, 2005 pp. 620-624 vol. 1.*

Jongren, "Quantized feedback information in orthogonal space-time block coding", IEEE Transactions on Information Theory, vol. 50, Issue 10, Oct. 2004 pp. 2473-2486.*

Shengli Zhou, "Adaptive Modulation for multiantenna transmissions with channel mean feedback", IEEE Transactions on Wireless Communications, vol. 3, Issue 5, Sep. 2004 pp. 1626-1636.*

Choi, "Interpolation based unitary precoding for spatial multiplexing MIMO-OFDM with limited feedback", Global Telecommunications Conference, 2004, GLOBECOM '04, IEEE vol. 1, Nov. 29-Dec. 3, 2004 pp. 214-218 vol. 1.*

Choi, "Interpolation based transmit beamforming for MIMO-OFDM with limited feedback" IEEE Transactions on [see also Acoustics, Speech, and Signal Processing, IEEE Transactions on]Signal Processing, vol. 53, Issue 11, Nov. 2005 pp. 4125-4135.*

Chio, "Interpolation based transmit beamforming for MIMO-OFDM with limited feedback", 2004 IEEE International Conference on Communications, vol. 1, Jun. 20-24, 2004 pp. 249-253 vol. 1.*

Love, "Limited feedback unitary precoding for orthogonal space-time block codes", Signal Processing, IEEE Transactions on [see also Acoustics, Speech, and Signal Processing, IEEE Transactions on] vol. 53, Issue 1, Jan. 2005 pp. 64-73.*

Love, "Limited feedback power loading for OFDM", Military Communications Conference, 2004, MILCOM 2004, IEEE vol. 1, Oct. 31-Nov. 3, 2004 pp. 71-77 vol. 1.*

Love, "Limited feedback unitary precoding for spatial multiplexing systems", IEEE Transactions on Information Theory, vol. 51, Issue 8, Aug. 2005 pp. 2967-2976.*

Love, "Limited feedback precoding for spatial multiplexing systems", GLOBECOM '03, IEEE, Global Telecommunications Conference, 2003, vol. 4, Dec. 1-5, 2003 pp. 1857-1861 vol. 4.*

Love, "Limited feedback precoding for spatial multiplexing systems using linear receivers", 2003, MILCOM 2003, IEEE Military Communications Conference, vol. 1, Oct. 13-16, 2003 pp. 627-632 vol. 1.*

Liu, "Space time trellis codes based on channel phase feedback," 2005 IEEE International Conference on Communications, 2005, ICC 2005, vol. 5, May 16-20, 2005 pp. 2916-2921 vol. 5.*

R.S. Blumm, "MIMO with Limited Feedback of Channel State Information," in *Proc. Of Intl. Conf. on ASSP*, Hong Kong, Apr. 2003, pp. 89-92.

J. Choi, et al., "Interpolation Based Transmit Beamforming for MIMO-OFDM with Limited Feedback," in *Proc. Of Intl. Conf. on Communications*, Paris, France, Jun. 2004, vol. 1, pp. 249-253, journal version to appear at IEEE Transactions on Signal Processing.

J. Choi, et al., "Interpolation Based Unitary Precoding for Spatial Multiplexing MIMO-OFDM with Limited Feedback," in *Proc. Of Global Telecommunications Conference*, Dallas, TX, Nov. 29-Dec. 3, 2004.

G. Jongren, et al., "Utilizing Quantized Feedback Information in Orthogonal Space-time Block Coding," in *Proc. Of Global Telecommunications Conference*, 2000, vol. 2, pp. 995-999.

D.J. Love, et al., "What is the Value of Limited Feedback for MIMO channels?" *IEEE Communications Magazine*, vol. 42, No. 10, pp. 54-59; Oct. 2004.

P. Xia, et al., "Adaptive MIMO-OFDM based on Partial Channel State Information," *IEEE Transactions on Signal Processing*, vol. 52, No. 1, pp. 202-213, Jan. 2004.

International Search Report Dated: Oct. 2, 2007.

* cited by examiner

TRELLIS-BASED FEEDBACK REDUCTION FOR MULTIPLE INPUT MULTIPLE OUTPUT ORTHOGONAL FREQUENCY DIVISION MULTIPLEXING (MIMO-OFDM) WITH RATE-LIMITED FEEDBACK

CROSS-REFERENCE TO RELATED APPLICATION

This application claims the benefit of U.S. provisional patent application No. 60/737,815, filed Nov. 17, 2005, the disclosure of which is incorporated herein by reference in its entirety.

STATEMENT OF GOVERNMENT INTERESTS

The research giving rise to the present invention was sponsored by the Office of Naval Research under Contract Number N00014-04-1-013. Accordingly, the government has certain interests in the present invention.

TECHNICAL FIELD

The present invention relates to digital wireless communication and, more particularly, to a method for reducing feedback while improving communications performance in an adaptive Multiple Input, Multiple Output Orthogonal Frequency Division Multiplexing (MIMO-OFDM) system.

BACKGROUND

The wireless channel in a wireless communication system constitutes a hostile propagation medium. This medium suffers from fading, which is caused by the destructive addition of multiple replicas of a transmitted signal which are detected by a receiver from multiple paths. Another problem with wireless data transmission is interference from other users. One approach to combating fading and interference is to provide a receiver with several identical replicas of a transmitted signal. This is accomplished by diversity techniques. One such technique is antenna diversity, in which an array of antennas is deployed at the transmit side and/or the receive side of a wireless link. Another name for a system which employs antenna diversity at both the transmit side and receive side of a wireless link is a multiple-input multiple-output (MIMO) system.

FIG. 1 depicts a typical MIMO system, generally indicated at 10, which is known in the prior art. Digital data 12 is encoded by an encoder 14 using one of several encoding techniques, such as quadrature amplitude modulation (QAM). The encoded data is demultiplexed into several data streams by a demultiplexer 16. The demultiplexer 16 feeds the multiple data streams to a plurality of modulators $18_a$-$18_{Nt}$ using orthogonal frequency division multiplexing (OFDM) to be discussed hereinbelow. The modulated signals are then transmitted through the wireless medium simultaneously via $N_t$ antennas $20a$-$20_{Nt}$. While traveling through the wireless medium, some of the signals transmitted from the antennas $20a$-$20_{Nt}$ may reflect from obstructions 22, 24, such as buildings, cars, trees, and the like. Signals transmitted directly from all of the sending antennas $20a$-$20_{Nt}$ and indirectly from the obstructions 22, 24 are received at $N_r$ receive antennas $26a$-$26_{Nr}$. A MIMO receiver 28 demodulates, multiplexes, and decodes the several received data streams into a single received data stream. Designating the signal received at each of the receive antennas $26a$-$26_{Nr}$ as $y_j$, and the signals transmitted at the sending antennas $20a$-$20_{Nt}$ as $x_i$, the signals received at each of the receive antennas $26a$-$26_{Nr}$ can be represented as a set of linear equations wherein "h" is the signal weight, as follows:

$$y_1 = h_{11}x_1 + h_{12}x_2 + \ldots + h_{1N_t}x_{N_t}$$

$$y_2 = h_{21}x_1 + h_{21}x_2 + \ldots + h_{2N_t}x_{N_t}$$

$$y_{Nr} = h_{N_r1}x_1 + h_{N_r2}x_2 + \ldots + h_{N_rN_t}x_{N_t}$$

As can be seen from the above equations, in making their way from the sending antennas $20a$-$20_{Nt}$ to the receive antennas $26a$-$26_{Nr}$, the independent signals, $x_1$ through $x_{Nt}$, are all combined. Traditionally, this "combination" has been treated as interference. By treating the channel as a matrix, however, the independent transmitted streams, $x_i$, can be recovered by estimating the individual channel weights $h_{ij}$. The transmitted signals $x_i$ and the received signals $y_j$ can be collected into vectors, x and y of dimensions $N_t \times 1$ and $N_r \times 1$, respectively, and the channel weights $h_{ij}$ can be collected into a channel matrix H of dimensions $N_r \times N_t$. The channel input-output relationship in matrix-vector form can be expressed as:

$$y = Hx + v$$

where v is a vector of channel noise to be discussed hereinbelow. Having estimated H, one can solve for the values of the transmit vector x by multiplying the receive vector y by the inverse of H and subtracting v therefrom.

Because multiple data streams are transmitted in parallel from different antennas, there is a linear increase in throughput with every pair of antennas added to the system. In current wireless communication schemes, there is not only a need to increase throughput, but also a need to improve the quality of the received signals. Because of reflections from different obstructions 22, 24, sometimes the reflected signals add up in phase and sometimes they add up out of phase causing a "fade". A fade causes the received signal strength to fluctuate constantly. Different sub-channels (the transmitted signals) are distorted differently, which leads to a sub-channel becoming frequency selective. As throughput (data rate) increases, frequency selectivity also increases. Systems employing orthogonal frequency division multiplex (OFDM) modulation convert frequency selective channels into a set of parallel flat-fading sub-channels, thus enabling low complexity equalization. The "orthogonal" part of the name refers to a property of sub-channels in which the frequencies in each sub-band are integer multiples of a fundamental frequency. This ensures that even though the sub-channels overlap, they do not interfere with each other, thereby removing the frequency selectivity and thus increasing spectral efficiency. The wedding of MIMO and OFDM for high speed applications combines high throughput with high spectral efficiency.

The operations performed on a transmit side of a datastream of a block of symbols of length N as it passes through an OFDM modulator include the steps of: encoding the block of symbols using an encoding scheme such as quadrature amplitude modulation (QAM); passing the encoded symbols through a serial-to-parallel converter; performing an Inverse Fast Fourier Transformation (IFFT) on the parallel data; prepending to the parallel data a cyclic prefix (CP) of length $L_{CP} \geq L$ containing a copy of the last $L_{CP}$ samples of the parallel-to-serial converted output of the N-point IFFT; and passing the data through the parallel-to-serial converter. The length of the cyclic prefix (CP) being greater than or equal to the length of the discrete-time baseband channel impulse response (i.e., $L_{CP} > L$) guarantees that the frequency-selective MIMO fading channel decouples into a set of parallel frequency-flat MIMO fading channels. The symbols are converted back to analog form and transmitted from transmit antennas into the wireless medium.

On the receive side of the wireless medium, an antenna receives an OFDM-modulated signal and passes the signal through an OFDM de-modulator. The OFDM de-modulator performs the following operations: stripping the cyclic prefix; converting the serial data to parallel form; performing an N-point Fast Fourier Transformation (FFT) on the data, converting the parallel data back to serial form, and decoding the data (e.g., via a QAM-decoder).

To improve data transmission and error performance still further, finite-rate transmit beamforming is applied to multiple data symbols x to be transmitted for each of p subcarriers. In finite-rate transmit beamforming, some of the data bits received at the receiver 28 are fed back to the transmitter/modulators $18a$-$18_{Nt}$ so that the transmitter can adapt to changing channel conditions via beamforming weights applied to the signal to be transmitted. In a multi-antenna wireless communication system having $N_t$ transmit-antennas and $N_r$ receive-antennas, each transmit antenna employing OFDM using $N_c$ subcarriers, the fading channel between the μ-th transmit-antenna and the υ-th receive-antenna is assumed to be frequency-selective but time-flat, and is described by a linear filter with LL+1 taps, as follows:

$$h_{\upsilon\mu}(n) := \{h_{\upsilon\mu}(n;0), \ldots, h_{\upsilon\mu}(n;LL)\},$$

where n is the OFDM symbol index and LL is the channel order. The channel impulse response includes the effects of transmit-receive filters, physical multipath, and relative delays among antennas. With p denoting the OFDM subcarrier index, the frequency response between the μ-th transmit-antenna and the υ-th receive-antenna on the p-th subcarrier is:

$$H_{\upsilon\mu}[n; p] = \sum_{l=0}^{LL} h_{\upsilon\mu}(n; l) e^{-j2\pi pl/N_c}, \quad p = 0, \ldots, N_c - 1.$$

At the p-th subcarrier of the n-th OFDM symbol, by collecting the transmitted symbols across $N_t$ transmit antennas in an $N_t \times 1$ vector x[n;p], and the received symbols across $N_r$ receive-antennas in an $N_r \times 1$ vector y[n;p], the channel input-output relationship on the p-th subcarrier is:

$$Y[n;p] = H[n;p]x[n;p] + v[n;p],$$

where v[n;p] is additive white Gaussian noise (AWGN) with each entry having a variance with each entry having variance $N_0$ and H[n;p] is the $N_r \times N_p$ channel matrix with the (υ,μ)-th entry being $H_{\upsilon\mu}(n;p)$.

With finite rate transmit beamforming, an information symbol s[n;p] is multiplied by an $N_t \times 1$ beamforming vector w[p] to form x[n;p]=w[p]s[n;p], which is then transmitted through the p-th sub-carrier of the OFDM system. The input-output relationship on the p-th sub-carrier can be expressed as:

$$y[n;p] = H[p]w[p]s[n;p] + v[n;p]$$

Based on feedback, the transmitter seeks to match the beamforming vector w[p] to the channel H[p] to improve system performance.

If the transmitter has perfect knowledge of H[p], the optimal beamforming vector will be the eigenvector of $H^H[p]$ H[p], where $H^H[p]$ is the Hermitian transpose of H[p], corresponding to the largest eigenvalue to maximize the signal to noise ratio (SNR) on each sub-channel, where the SNR is designated as γ[p], and:

$$\gamma[p] = \frac{E_S}{N_0} \|H[p]w[p]\|^2$$

where $E_s$ is the average energy per symbol s[n;p] and ‖*‖ denotes a two-norm of a vector or a matrix. Assuming a maximum ratio combining (MRC) receiver, the received symbols ŝ[n;p] are:

$$\hat{s}[n;p] = w^H[p]H^H[p]y[n;p]$$

where $w^H[p]$ is the Hermitian transpose of w[p] and $H^H[p]$ is the Hermitian transpose of H[p].

Finite rate transmit beamforming satisfies the condition that channel behavior is known to both the receiver and transmitter. This behavior is represented by the matrix H[p], which can be estimated by the receiver, which has knowledge of the effects of the wireless channel. This means that the receiver would have to estimate H[p] for each OFDM frequency channel, and send all of this information back to the transmitter. This information is ancillary data that is not part of the information transmitted. Thus, it is desirable that the amount of bandwidth dedicated to feedback information be kept to a minimum. In fact, the transmission of a matrix is an expensive operation, since a matrix has many elements (the square of the dimension).

A technique known as finite rate feedback can be employed to minimize the data to be transmitted from the receiver to the transmitter, yet maximize the knowledge gained by the transmitter about the channel to improve beamforming. One version of finite rate feedback is "per subcarrier feedback." In per subcarrier feedback, feedback is done separately on all sub-channels. Assuming that $B_1$ feedback bits are available per subcarrier, the transceiver will need a codebook CB of size $2^{B_1}$, which is a collection of beamforming vectors $\{w_1, \ldots, w_{2^{B_1}}\}$. It is assumed that the codebook CB is the same across subcarriers. The beamforming vector is chosen at the receiver to maximize γ[p] at the p-th subcarrier to be:

$$w^{opt}[p] = \arg \max_{w=W} \|H[p]w\|^2.$$

The index of $w^{opt}[p]$ will be fed to the transmitter $B_1$ feedback bits. The transmitter then switches to $w^{opt}[p]$ after finding $w^{opt}[p]$ via the index in its own codebook. Unfortunately, with finite rate feedback, $N_c B_1$ bits need to be fed back to the transmitter, which is a large number of bits considering that $N_c$ is usually large.

Another technique known in the art is the one employed by Choi and Heath known as interpolation, which is described in the "Interpolation Based Transmit Beamforming for MIMO-OFDM with Limited Feedback," in *Proc. Of Int. Conf. on Communications*, Paris, France, June 2004, vol. 1, pp. 249-253, which is incorporated herein by reference. In the interpolation technique, $N_c$ subcarriers are split into $N_g$ groups with $N_c/N_g$ consecutive subcarriers per group. Only $\{w_{opt}[lN_g]\}$ $$\{w_{opt}[lN_g]\}_{l=0}^{N_c/N_g - 1}$$

bits will be fed back to the transmitter, and the rest of the subcarriers rely on the following interpolation:

$$w[lN_g + k] = \frac{(1 - k/N_g)w^{opt}[lN_g] + e^{j\theta_l}(k/N_g)w^{opt}[(l+1)N_g]}{\|(1 - k/N_g)w^{opt}[lN_g] + e^{j\theta_l}(k/N_g)w^{opt}[(l+1)N_g]\|}$$

where $\theta_l$ is chosen from a finite set $\{e^{jn2\pi/P}\}_{n=0}^{P-1}$. The feedback required for the interpolation method is $(N_c/N_g)(B_1 + \log_2 P)$ bits, which is a significant improvement over the finite rate feedback technique. Unfortunately, the interpolation technique suffers from "diversity loss," in which bit error rate (BER) levels off as the signal-to-noise ratio (SNR) increases.

Thus, despite efforts to date, a need remains for methods that are effective in reducing feedback in an adaptive MIMO-OFDM system while maintaining performance. These and other needs are satisfied by the methods/techniques described herein.

SUMMARY OF THE DISCLOSURE

The present invention overcomes the disadvantages and shortcomings of the prior art discussed above by providing a method for reducing feedback in a MIMO-OFDM system. The present invention employs a feedback method that uses vector quantization compression to limit the size of feedback data required to be sent to a transmitter for optimizing communications between MIMO-OFDM devices. In exemplary embodiments of the present invention, the following steps are employed: (i) receiving a plurality of symbols from a plurality of sub-carriers at a receiver; (ii) selecting a plurality of indices of codewords corresponding to a codebook of pre-coding weighting matrices for the sub-carriers based on vector quantization compression of the codewords; and (iii) transmitting the selected indices over a wireless channel to a transmitter.

Vector quantization compression techniques for reducing feedback while maintaining performance may be advantageously employed according to the present disclosure because subchannel responses across OFDM subcarriers are correlated. Vector quantization compression generally takes two forms: (i) finite state vector quantization feedback and (ii) trellis-based feedback. As demonstrated herein, either of the foregoing vector quantization compression approaches may be employed to advantage according to the present disclosure.

Finite state vector quantization feedback makes use of a finite state vector quantizer (FSVQ), which is a recursive vector quantizer (VQ) with a finite number of states. In finite state vector quantization feedback, optimal precoding matrices (beamforming vectors) are selected sequentially across subcarriers. After selecting the first precoding matrix from a codebook of a certain size, subsequent precoding matrices are selected from a smaller time-varying codebook per subcarrier depending on prior decisions. In a trellis-based feedback method, the optimal precoding matrices are selected at the same time for all subcarriers by searching for the optimum choice of matrices along a trellis using the Viterbi algorithm (dynamic programming).

The finite state vector quantization feedback and trellis-based feedback techniques for reducing feedback while maintaining performance as described herein are transmission schemes which are applicable to transceivers of different design, including transmitters which use adaptive (finite rate per subcarrier) beamforming, precoded spatial multiplexing, or precoded orthogonal space-time block codes (STBC). Simulation results demonstrate that the trellis-based method outperforms an interpolation method which incurs diversity loss at high signal-to-noise ratio.

Further features and advantages of the present invention will appear more clearly on a reading of the following detailed description of the present invention, with reference to the accompanying drawings.

BRIEF DESCRIPTION OF THE DRAWINGS

For a more complete understanding of the present invention, reference is made to the following detailed description of the invention considered in conjunction with the accompanying drawings, in which.

DETAILED DESCRIPTION OF THE PRESENT INVENTION

The present invention may be used in conjunction with a MIMO-OFDM system to reduce feedback while enhancing communications. The disclosed methods and techniques of the present invention employ a feedback method that uses vector quantization compression to minimize the amount of feedback data sent to the transmitter for improving communications between MIMO-OFDM systems. In general, the present invention involves the steps of: receiving a plurality of symbols from a plurality of sub-carriers at a receiver; selecting a plurality of indices of codewords corresponding to a codebook of pre-coding weighting matrices for the sub-carriers based on vector quantization compression of the codewords; and transmitting the selected indices over a wireless channel to the transmitter.

Figure 2:
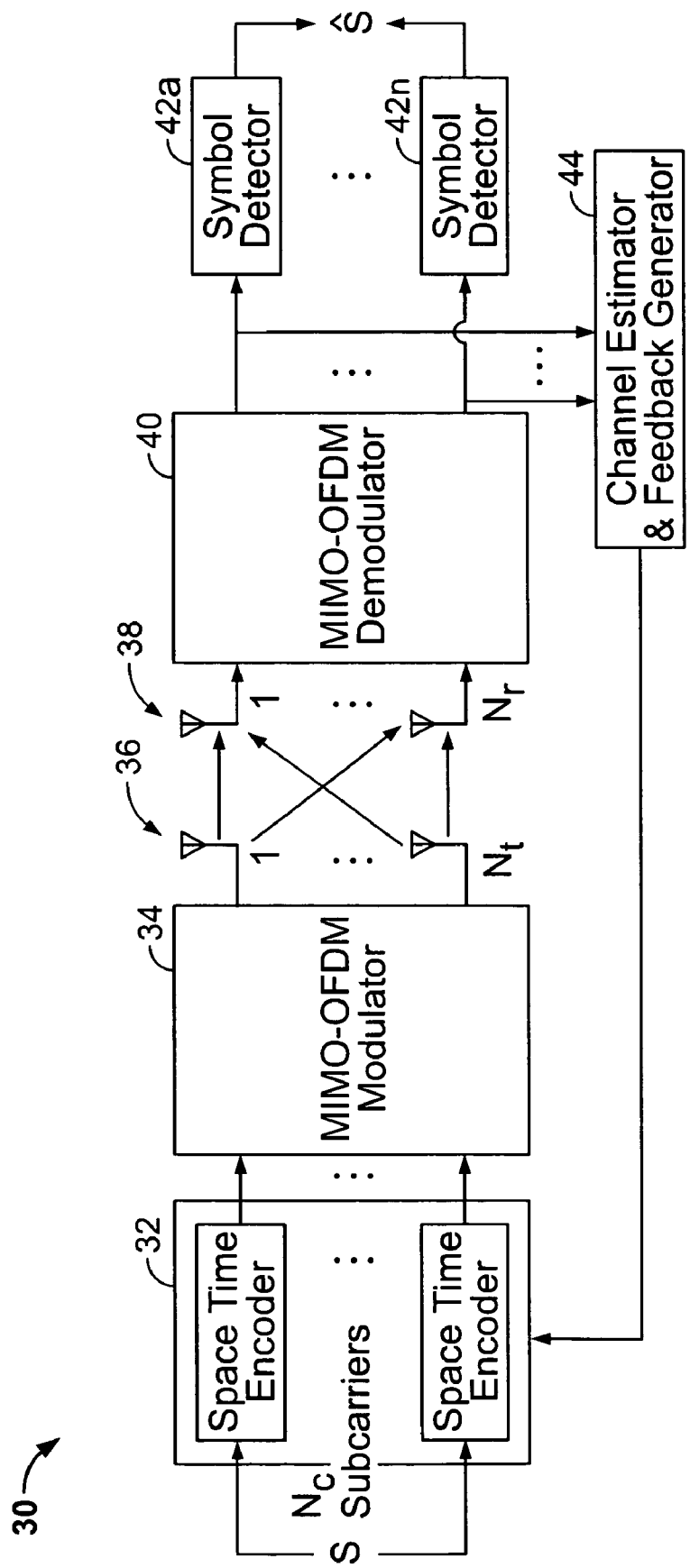
FIG. 2 is a block diagram of a MIMO-OFDM system using vector quantization feedback, constructed in accordance with an exemplary embodiment of the present invention.

With initial reference to FIG. 2, a block diagram of a MIMO-OFDM system using a vector quantization feedback arrangement is provided, generally indicated at 30, and constructed in accordance with an exemplary embodiment of the present invention. Symbols "s" are adjusted by a space time encoder 32, and represent units of data to be transmitted over a MIMO-OFDM communications system. The space time encoder 32 can apply one of a plurality of weighting techniques, including adaptive (finite rate per subcarrier) beamforming, spatial multiplexing, or precoded orthogonal space-time block codes (STBC). The weighted symbols are further processed by a MIMO-OFDM modulator 34, transmitted through a wireless medium via transmit antennas 36 (i.e., antennas 1 through $N_t$), received by receive antennas 38 (i.e., antennas 1 through $N_r$), demodulated by a MIMO-OFDM demodulator 40, and detected as symbols "ŝ" by symbol detectors 42a-42n.

The MIMO-OFDM modulator 34, transmit antennas 36, receive antennas 38, and MIMO-OFDM demodulator 40 have a construction similar to the one previously discussed in connection with the prior art of FIG. 1. Due to limited feedback, the space time encoder 32 cannot take on arbitrary values. In order to generate weighted symbols at the space time encoder 32 with sufficient performance, a finite number of bits representing the index of a codeword corresponding to an optimal weighting vector are fed back to the space time encoder 32 via a feedback generator 44. The feedback generator 44 could implement finite-state or trellis-based vector quantization techniques. At the space time encoder 32, the index represented by the codeword selects the best weighting vector from the codebook.

Figure 1:
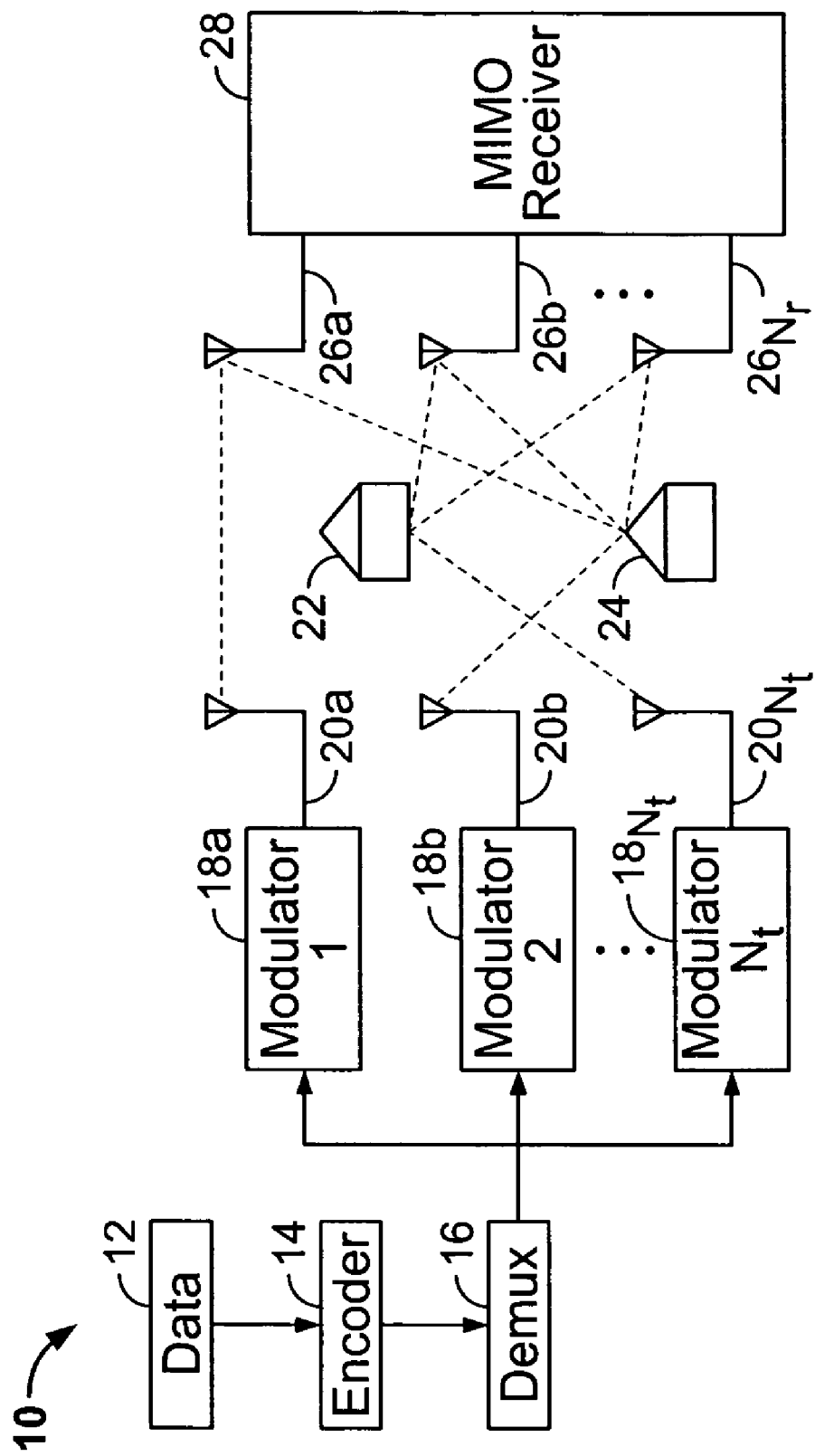
FIG. 1 is a block diagram of an MIMO-OFDM system as is known in the prior art.

Finite rate beamforming, already discussed with reference to FIG. 1, is really a special case of a more general form of feedback, in which, to increase the transmission rate, instead of transmitting one symbol per subcarrier, multiple ($N_s$) symbols can be transmitted in parallel, a technique known as precoded spatial multiplexing. In precoded spatial multiplexing, at the p-th subcarrier, $N_s$ information symbols are formed into an $N_s \times 1$ vector s[n;p]. The symbol vector s[n;p] can be precoded by a matrix T[p] of size $N_t \times N_s$ to form a transmitted block x[n;p]=T[p]s[n;p]. The channel input-output relationship becomes:

$$y[n;p]=H[p]T[p]s[n;p]+v[n;p]$$

where s[n;p] reduces to s[n;p], or one symbol per subcarrier, when $N_S$=1. T[p] can be drawn from a finite-size codebook $\mathcal{T}:=\{T_1, \ldots, T_N\}$.

The receiver structure used for receiving the ŝ[n;p] can be a linear minimum-mean square-error (MMSE) receiver. The linear MMSE receiver applies element-wise symbol detection in the symbol detectors 42a-42n such that a demodulated block ŝ[n; p]=$G^{mmse}$y[n; p], where:

$$G^{mmse}=[T^H[p]H^H[p]H[p]T[p]+(N_0/E_S)I_K]^{-1}T^H[p]H^H[p]$$

where $I_K$ is an identity matrix of size K, and $[*]^H$ is a Hermitian transpose.

A third type of transmission scheme used in conjunction with the present invention applies precoded orthogonal space-time block codes (STBC) on each OFDM subcarrier. As an illustrative example of precoded orthogonal STBC, an Altamouti code is used. On each subcarrier, a 2×2 Alamouti code matrix is constructed, which is then precoded by a $N_t \times 2$ matrix T[p] to obtain the transmitted blocks x[2i;p] and x[2i+1;p] for two consecutive OFDM symbols. Specifically, with two symbols s[2i;p] and s[2i+1;p], the transmitter constructs:

$$[x[2n; p], x[2n+1; p]] = T[p]\begin{bmatrix} s[2n; p] & -s^*[2n+1; p] \\ s[2n+1; p] & s^*[2n; p] \end{bmatrix}$$

Correspondingly, the received vectors in two consecutive time slots are:

$$[y[2n; p], y[2n+1; p]] = H[p]T[p]$$

$$\begin{bmatrix} s[2n; p] & -s^*[2n+1; p] \\ s[2n+1; p] & s^*[2n; p] \end{bmatrix} +$$

$$[v[2n; p], v[2n+1; p]]$$

Similar to precoded spatial multiplexing, T[p] can be drawn from a finite-size codebook $\mathcal{T}:=\{T_1, \ldots, T_N\}$. The same codebook for precoded spatial multiplexing can be applied here.

Figure 3:
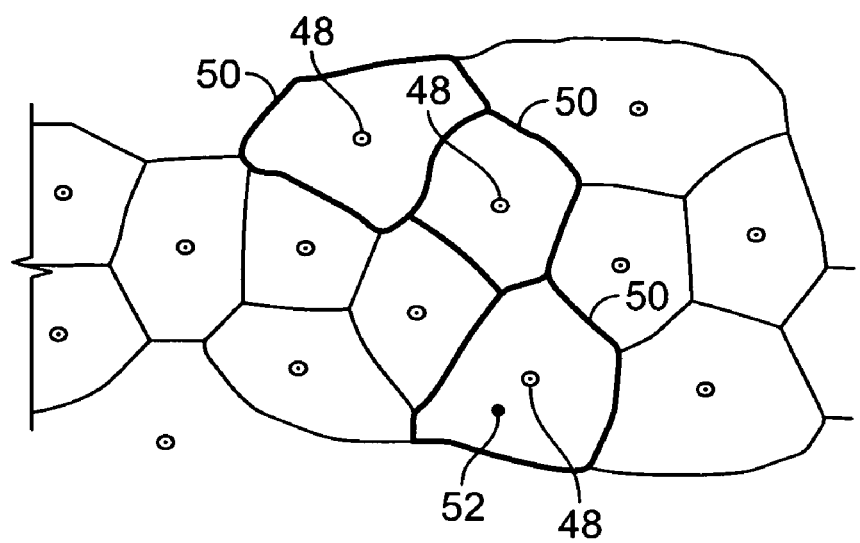
FIG. 3 is a graphical illustration of simple vector quantization for a two-dimensional space.

Reducing feedback while maintaining performance is made possible by the observation that subchannel responses across OFDM subcarriers are correlated. If the subchannel responses are correlated, then compression techniques, such as vector quantization, can be employed. For illustrative purposes, simple vector quantization for a two-dimensional space is depicted in FIG. 3. Codewords 48 are represented by dotted circles enclosed within regions 50. The codewords 48 are called codevectors and the regions 50 are called encoding regions. The set of all codevectors is called the codebook. The codeword 48 representing the precoding matrix T is chosen for all possible values of T that fall within the region 50, which are in the neighborhood of the codeword 48. Although it is desirable to feedback the ideal precoding matrix T, designated as 52, the best possible choice within the codebook that can be fed back to the receiver and still be within the codebook of T is accomplished by choosing the codeword 48. If there are $2^{B_1}$ total possible codewords in the codebook for T, then $B_1$ bits can be feed back to the transmitter from the receiver.

The criterion for choosing an optimal precoding matrix T per subcarrier depends on the specific type of vector quantization used. In one embodiment of the present invention, a finite state vector quantizer (FSVQ) is used. An FSVQ is a recursive vector quantizer with a finite number of states. A recursive vector quantizer is a vector quantizer with memory, where the vector quantizer output depends not only on the current input, but also on prior inputs. Using state variable to summarize the influence of the past on the current operation of the vector quantizer, recursive vector quantization can be effectively described by state transition and state-dependent encoding. In the present invention, finite state vector quantization (FSVQ) is applied to the precoding matrices T by choosing the optimal precoding matrix from a codebook sequentially across subcarriers from p=0 to p=$N_c$−1, where p is treated as a virtual time index for transitions between states.

Figure 4:
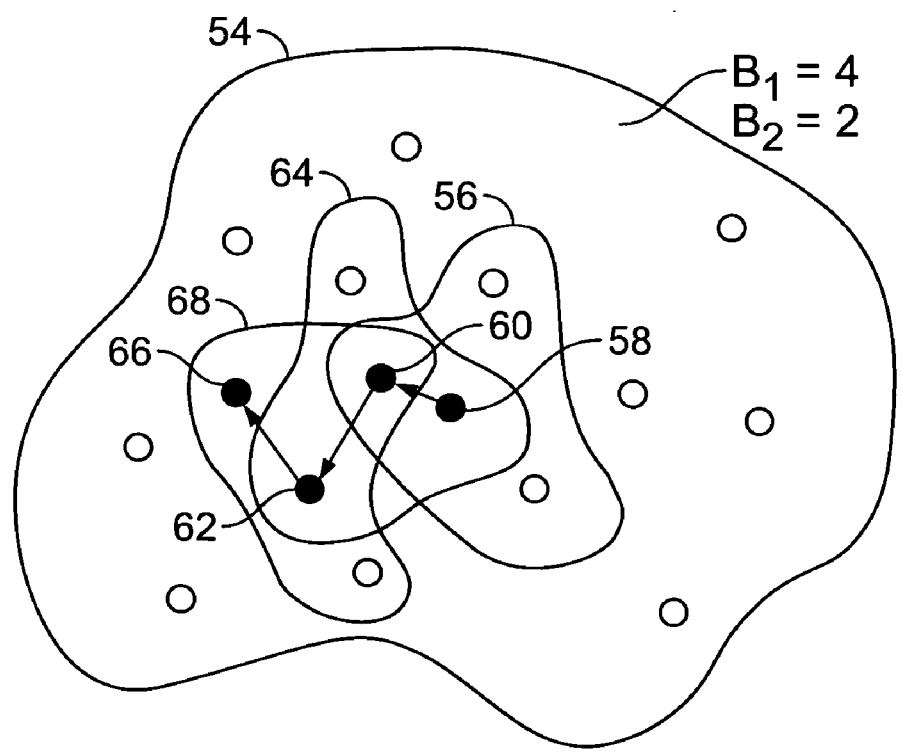
FIG. 4 is a graphical illustration of a finite state vector quantization (FSVQ) method of feedback reduction used in accordance with an exemplary embodiment of the present invention.

Referring now to FIG. 4, finite state vector quantization (FSVQ) applied to the choice of precoding matrices T is illustrated graphically. Initially, a codebook $\{T_i\}$ has a total of $2^{B_1}$ codewords which can be represented by $B_1$ bits (region 54). The next codeword (for the next subchannel) is chosen from a smaller codebook of size $2^{B_2}$ which contain the nearest neighbors to the previous chosen codeword, which can be represented by $B_2$ bits where $B_2<B_1$ (region 56). The neighbors of $T_i$ are the set of codewords which minimize the chordal distance from $T_i$, where chordal distance from $T_i$ to $T_j$ is defined as:

$$d_c(T_i, T_j) = \frac{1}{\sqrt{2}} \|T_i T_i^{\mathcal{H}} - T_j T_j^{\mathcal{H}}\|_F.$$

where $\|*\|_F$ is a Frobenius norm of a matrix. As shown in FIG. 4, the process progresses sequentially from the codeword 58 in region 54, to codeword 60 in smaller region 56, to codeword 62 in region 64, to codeword 66 in region 68, etc., until all subcarrier indices p have been traversed. Notice that subsequent regions (e.g., region 68) also contain the previous choice of codeword (e.g. codeword 62).

Figure 5:
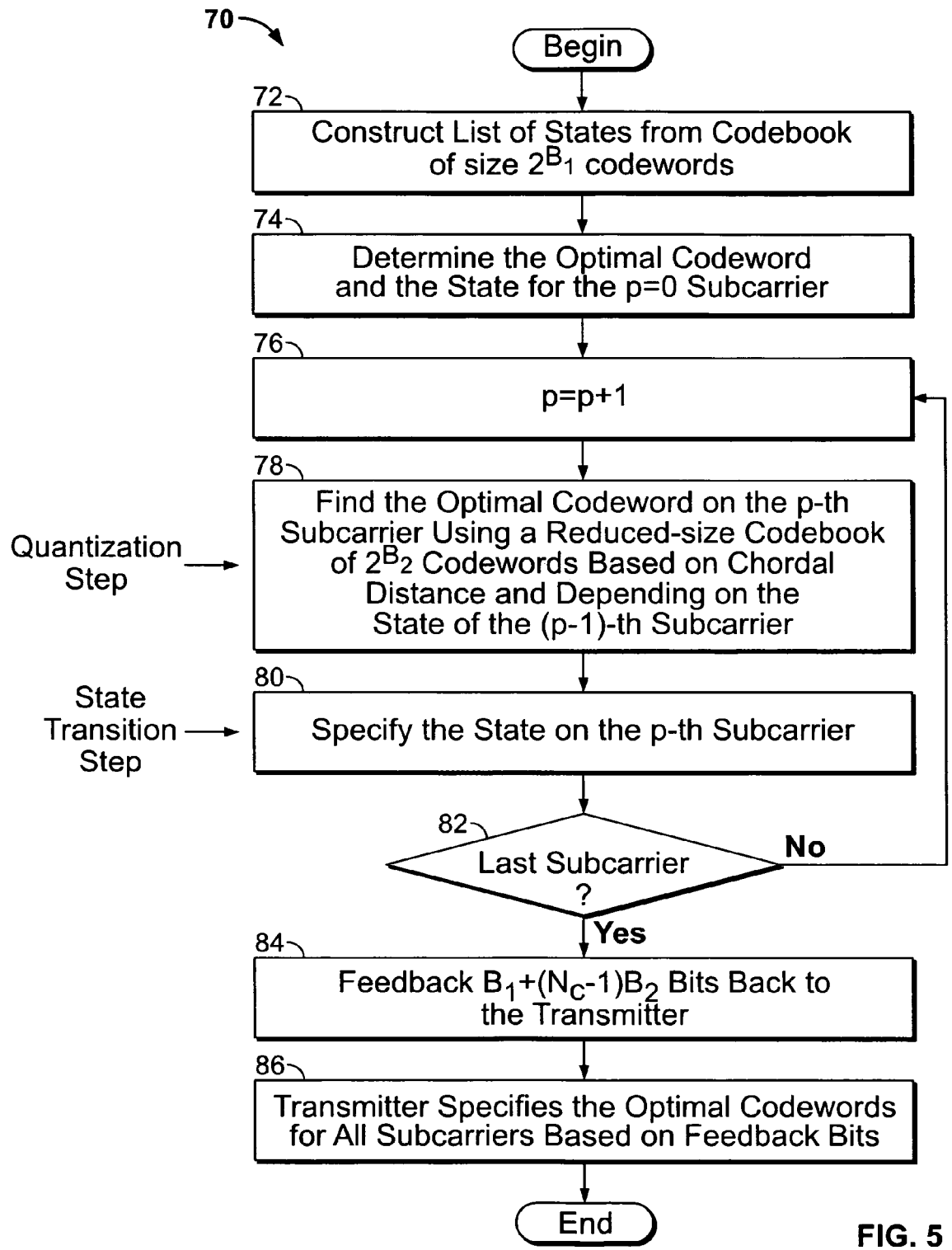
FIG. 5 is a flow chart showing processing steps of the method of illustrated in FIG. 4.

Referring now to FIG. 5, a flow chart 70 of the steps used to calculate the optimal T[p] using finite state vector quantization (FSVQ) is presented. At step 72, a list of a total of $2^{B_1}$ states is constructed from a predetermined codebook $\mathcal{T}$ represented by $B_1$ bits. Each state $\xi_i$ is characterized by one precoding matrix $T_i$. At step 74, the optimal codeword is determined from the codebook $\mathcal{T}$ and the state $\xi[0]$ is based on:

$$T^{opt}[p] = \arg\max_{T[p]\in\mathcal{T}} BER[p].$$

where $T^{opt}[p]$ is the precoded matrix which minimizes the bit error rate BER[p], at the p-th sub-carrier. Then, $$BER[p] = \frac{1}{N_g}\sum_{k=1}^{N_a} \phi(\gamma_k^{mmse}[p]).$$

$$\gamma_k^{mmse}[p] = \frac{E_g/N_0}{[T^{\mathcal{H}}[p]H^{\mathcal{H}}[p]H[p]T[p] + (N_0/E_g)I_K]_{k,k}^{-1}} - 1.$$

$$\phi(\gamma) = \frac{1}{\log_2\sqrt{M}} \sum_{k=1}^{\log_2\sqrt{M}} \frac{1}{\sqrt{M}} \sum_{t=0}^{(1-2^{-k})\sqrt{M}-1} \times$$

$$\left\{(-1)^{\left\lfloor\frac{t\cdot 2^{k-1}}{\sqrt{M}}\right\rfloor}\left(2^{k-1} - \left\lfloor\frac{i\cdot 2^{k-1}}{\sqrt{M}} + \frac{1}{2}\right\rfloor\right)\cdot 2Q\left((2i+1)\sqrt{\frac{3}{M-1}\gamma}\right)\right\}$$

$$Q(x) = \int_x^\infty \frac{1}{\sqrt{2\pi}}e^{-t^2/2}\,dt$$

where p=0 and M is the size of a square quadrature-amplitude-modulation (QAM) "constellation." At step 76, the value of p is incremented to evaluate the next (p-th) subcarrier. At step 78, a reduced-size codebook $\mathcal{T}_i$ is constructed which is a subset of $\mathcal{T}$ of size $2^{B_2}$ codewords, $B_2<B_1$, based on the previous state $\xi[p-1]$, where $\mathcal{T}[p-1]$ stands for the current codebook associated with the state $\xi[p-1]$ known at subcarrier p of the previous subcarrier p-1. The codewords in the codebook $\mathcal{T}_i$ are determined to be the collection of codewords nearest $T_i=T^{opt}[p-1]$. The set of codewords nearest $T_i$ minimize the chordal distance, defined as:

$$d_c(T_i, T_j) = \frac{1}{\sqrt{2}}\|T_i T_i^{\mathcal{H}} - T_j T_j^{\mathcal{H}}\|_F.$$

At step 80, the optimum precoding matrix $T^{opt}[p]$ at subcarrier p is determined from:

$$T^{opt}[p] = \arg\min_{T[p]\in\mathcal{T}[p-1]} BER[p],$$

Specifying $T^{opt}[p]$ requires $B_2$ bits, when $\mathcal{T}[p-1]$ is available. The next state $\xi[p]$ on the p-th subcarrier is determined to be $$\xi[p]=\xi_j, \text{if } T^{opt}[p]=T_j.$$

At step 82, if the current subcarrier p is not the last subcarrier p, then steps 76, 78, and 80 are repeated. If the last subcarrier has been reached, then at step 84, $B_1+(N_C-1)B_2$ bits are fed back to the transmitter, and correspond to the indices of the optimum codewords selected. Then, at step 86, the transmitter specifies the optimal codewords for all subcarriers based on the feedback bits.

Figure 6:
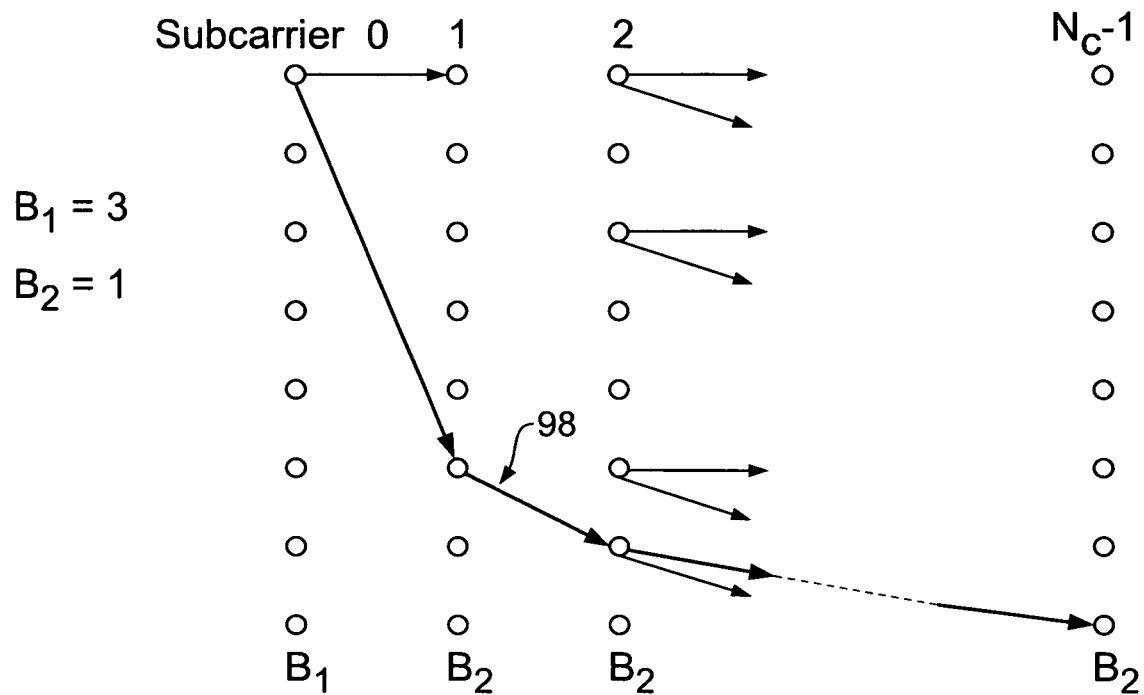
FIG. 6 is a graphical illustration of a trellis-based method of feedback reduction used in accordance with another exemplary embodiment of the present invention.

In an alternative embodiment of the present invention, the precoding matrices are chosen based on trellis-based feedback encoding. In trellis-based feedback encoding, the decision can be made at time $p=N_c-1$ to specify the optimal codeword indices for all subcarriers at once, instead of sequentially as in finite state vector quantization (FSVQ). Referring now to FIG. 6, trellis-based feedback encoding is illustrated graphically. All possible transition states are plotted along the vertical axis, while all the subcarriers are plotted along the horizontal axis. From all of the possible paths from subcarrier 0 to subcarrier $N_C-1$, the optimal path through the trellis, designated at reference 98, is chosen to minimize the average bit error rate. This path is determined by means of the Viterbi algorithm (i.e., by dynamic programming).

Figure 7:
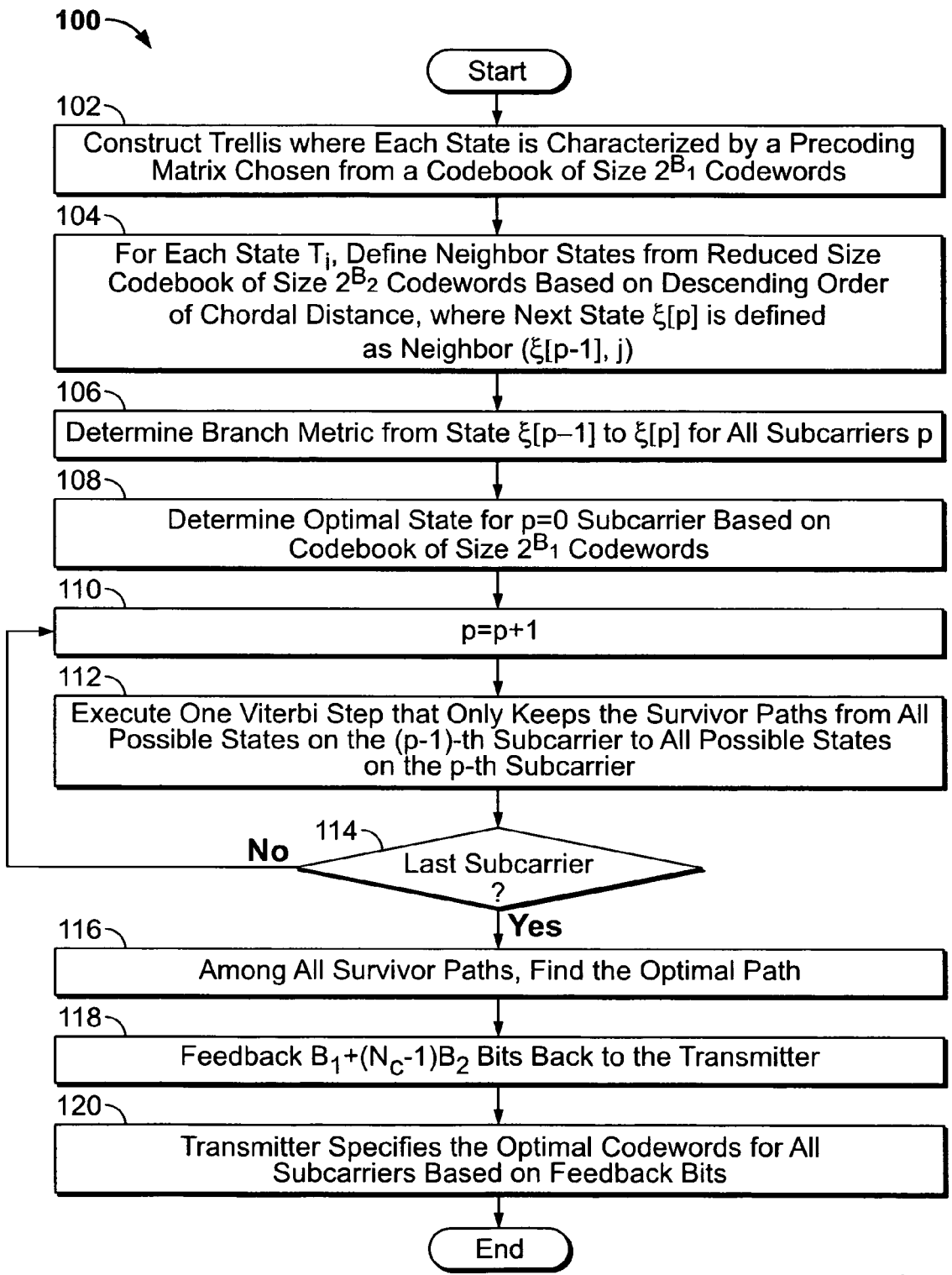
FIG. 7 is a flow chart showing processing steps of the method illustrated in FIG. 6.

Referring now to FIG. 7, an exemplary flow chart, designated at 100, of the steps used to calculate the optimal $T_i$ using trellis-based feedback encoding is presented. At step 102, a trellis is constructed by specifying a state transition table where all possible transition states are plotted along the vertical axis, and all the subcarriers "p" are plotted along the horizontal axis. There are total of $2^{B_1}$ states from a predetermined codebook $\mathcal{T}$ represented by $B_1$ bits. Each state $\xi_i$ is characterized by one precoding matrix $T_i$. At step 104, for each state $\xi_i$, $2^{B_2}$ neighbor states are defined and are denoted by the function Neighbor($\xi_i$, j) for j=0, ..., $2^{B_2}-1$. The next state $\xi[p]$ is defined as neighbor($\xi[p-1]$,j). The neighbor states are defined by arranging the codewords $T_i$, which is the collection of $2^{B_2}$ codewords, $B_2<B_1$, from $\mathcal{T}$ that are closest to $T_i$ in descending order of the chordal distances relative to $T_i$ where the chordal distance is defined as:

$$d_c(T_i, T_j) = \frac{1}{\sqrt{2}}\|T_i T_i^{\mathcal{H}} - T_j T_j^{\mathcal{H}}\|_F.$$

Each state $\xi[p-1]$ at the (p-1)-th subcarrier can only transit to one of the $2^{B_2}$ neighbor states on the p-th subcarrier. At step 106, a branch metric is determined from state $\xi[p-1]$ to $\xi[p]$ for all subcarriers "p" as:

$$\text{Metric}(\xi[p-1], \xi[p]) = \frac{1}{N_c} \text{BER}(\|H[p], \text{output}(\xi[p-1], j)\|)$$

where BER(*,*) is computed from:

$$BER[p] = \frac{1}{N_s} \sum_{k=1}^{N_s} \phi(\gamma_k^{mmse}[p])$$

as described above for finite state vector quantification (FSVQ). Output(*) is defined as the associated codeword for the j-th outgoing branch of $\xi[p-1]$, that ends at $\xi[p]$. At step 108, the optimal codeword is determined from the codebook $\mathcal{T}$ represented by $B_1$ bits and the state $\xi[0]$ of the p=0 subcarrier based on:

$$T^{opt}[p] = \arg\max_{T[p]\in \mathcal{T}} BER[p].$$

where $T^{opt}[p]$ is the precoded matrix which minimizes the bit error rate BER[p], at the p-th sub-carrier, and:

$$BER[p] = \frac{1}{N_s} \sum_{k=1}^{N_s} \phi(\gamma_k^{mmse}[p]).$$

both of which equations are calculated from the same equations used in recursive feedback. At step 110, the value of p is incremented to evaluate the next (p-th) subcarrier. At step 112, one Viterbi step is executed to keep the survivor paths from all possible states on the (p−1)-th subcarrier to all possible states on the p-th subcarrier. At step 114, if p is not the last subcarrier, then repeat steps 110 and 112. If the last subcarrier has been reached, then at step 116, the optimal path among all survivor paths is determined. The optimal path is the path along the trellis which minimizes the average bit error rate $\overline{BER}$ of the system, such that:

$$\overline{BER} = \sum_{p=0}^{N_c-1} \text{Metric}(\xi[p-1], \xi[p])$$

At step 118, $B_1+(N_c-1)B_2$ bits are fed back to the transmitter and correspond to the indices of the optimum codewords selected. At step 120, the transmitter specifies the optimal codewords for all subcarriers based on the feedback bits.

Figure 8:
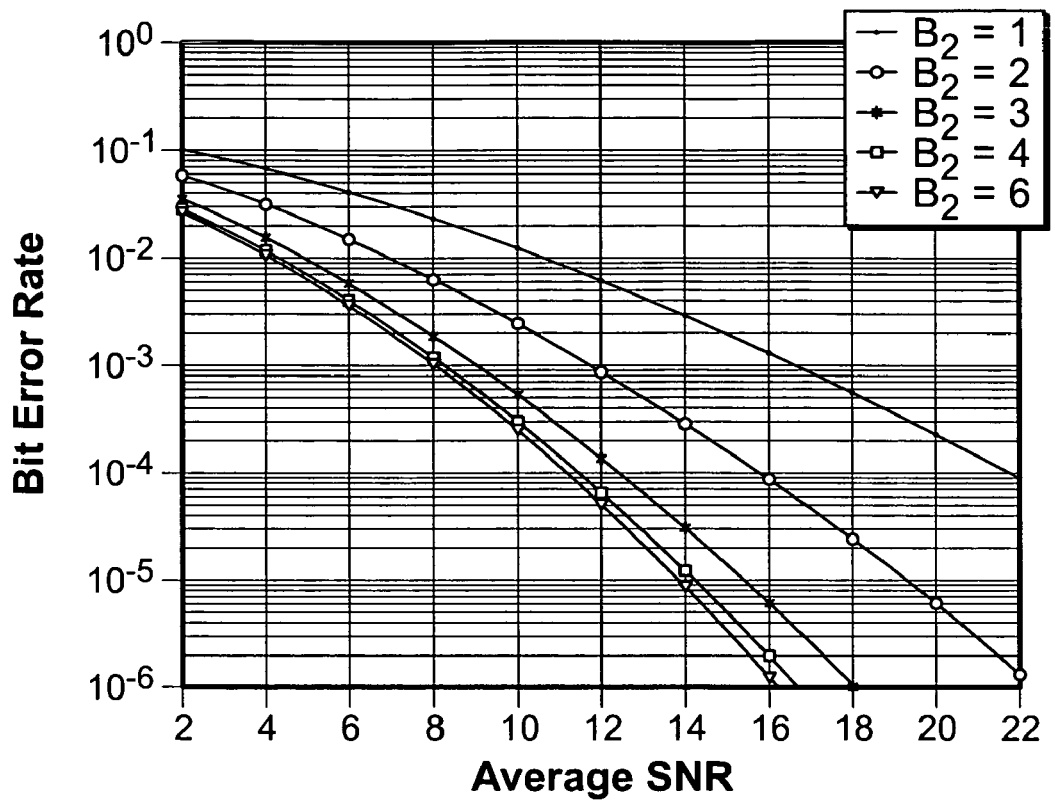
FIG. 8 is graph of bit error rates (BER) versus average signal-to-noise ratio (SNR), comparing the performance of recursive feedback reduction using finite state vector quantization (FSVQ) for different numbers of feedback bits per codeword.
Figure 9:
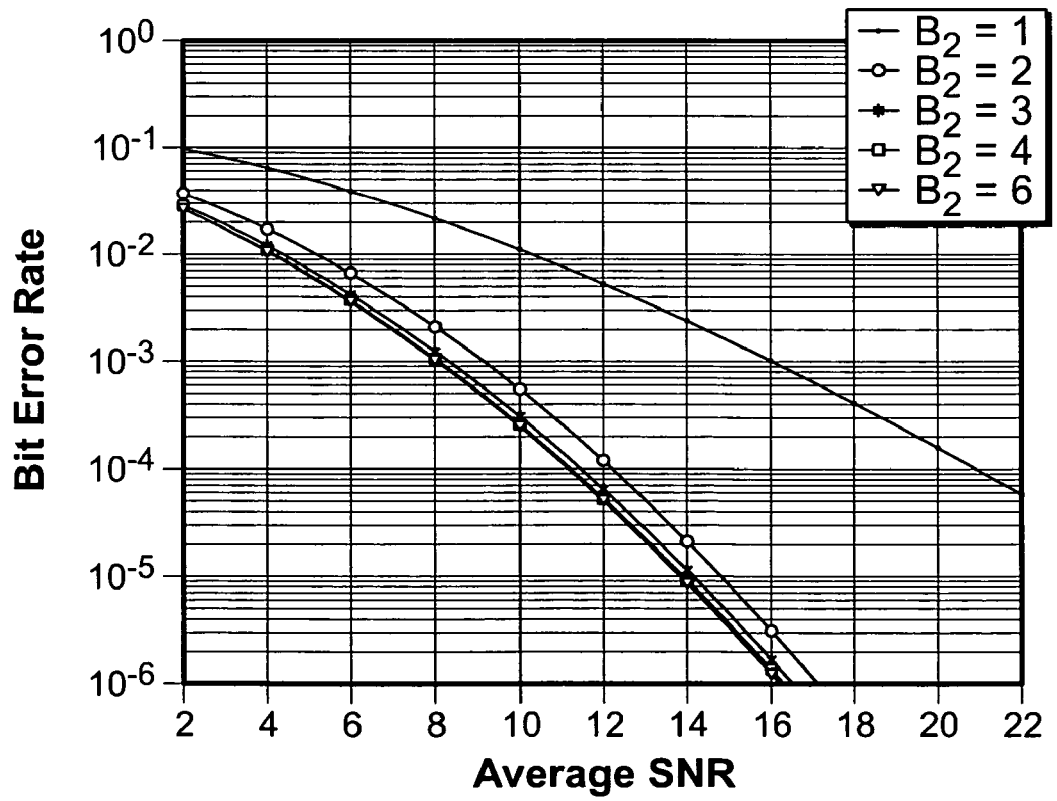
FIG. 9 is graph of bit error rates (BER) versus average signal-to-noise ratio (SNR), comparing the performance of trellis-based feedback reduction for different numbers of feedback bits per codeword.

Referring now to FIGS. 8 and 9, performance degradation with respect to reduced feedback is plotted graphically. The plots apply to MIMO-OFDM using transmit beamforming on each subcarrier with a beamforming codebook of size 64 so that $B_1$ is set to 6 so that per-subcarrier feedback requires $N_c B_1$=384 bits. To generate the plots, $N_t$ is set to 4 and $N_r$ is set to 1. $B_2$ is set to one of 1, 2, 3, 4, and 6. FIG. 8 depicts the BER performance vs. Average SNR (Signal-to-noise ratio) for a recursive finite state vector quantification (FSVQ) method, and FIG. 9 depicts BER performance for the trellis-based method. As $B_2$ increases in value, the performance for both methods improves quickly. Note that when $B_2$=3 in FIG. 9, performance degradation is negligible. The FSVQ method depicted in FIG. 8 works best when the feedback reduction percentage is small.

Figure 10:
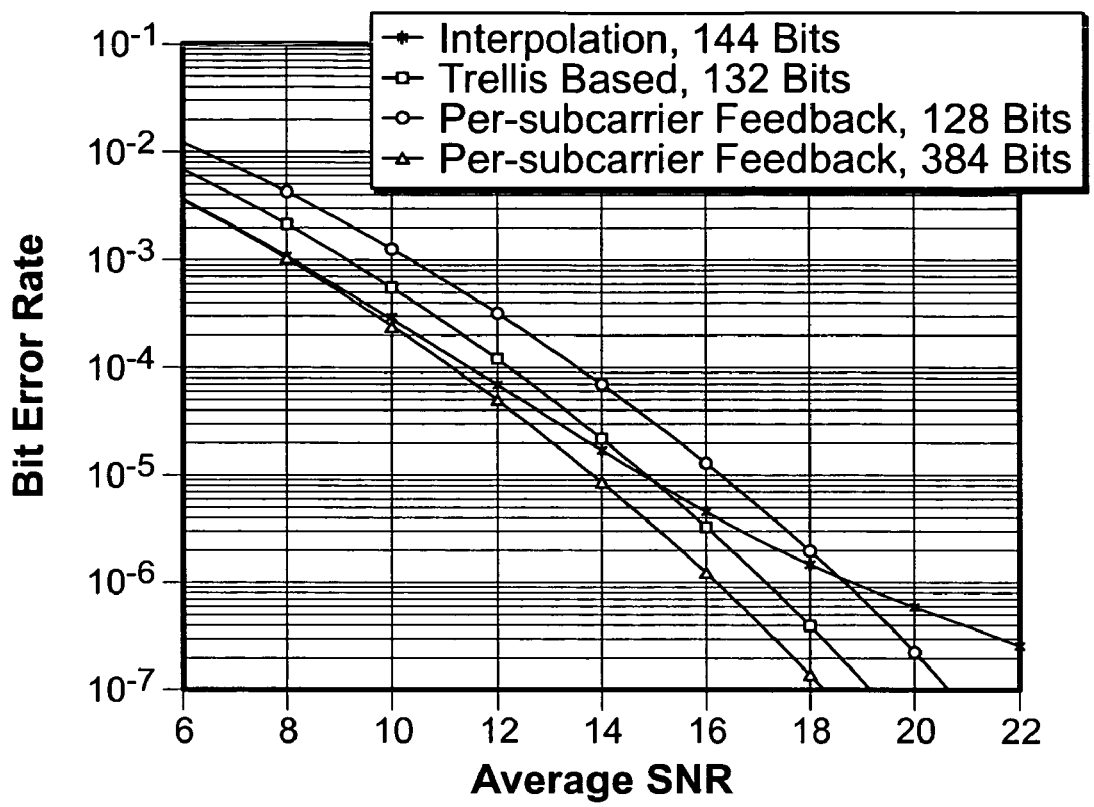
FIG. 10 is graph of bit error rates (BER) versus average signal-to-noise ratio (SNR), comparing the performance of transmit beamforming feedback for the per subcarrier method, the trellis method, and interpolation method.
Figure 11:
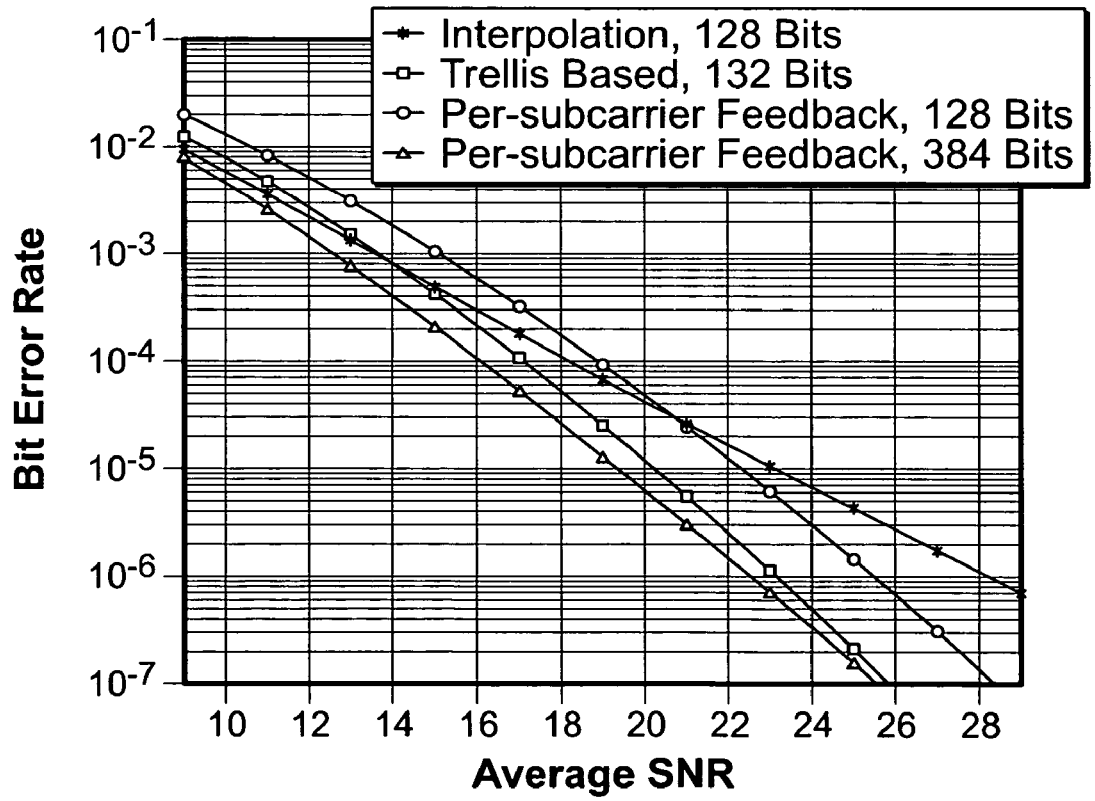
FIG. 11 is graph of bit error rates (BER) versus average signal-to-noise ratio (SNR), comparing the performance of precoded spatial multiplexing feedback for the per subcarrier method, the trellis method, and interpolation method.
Figure 12:
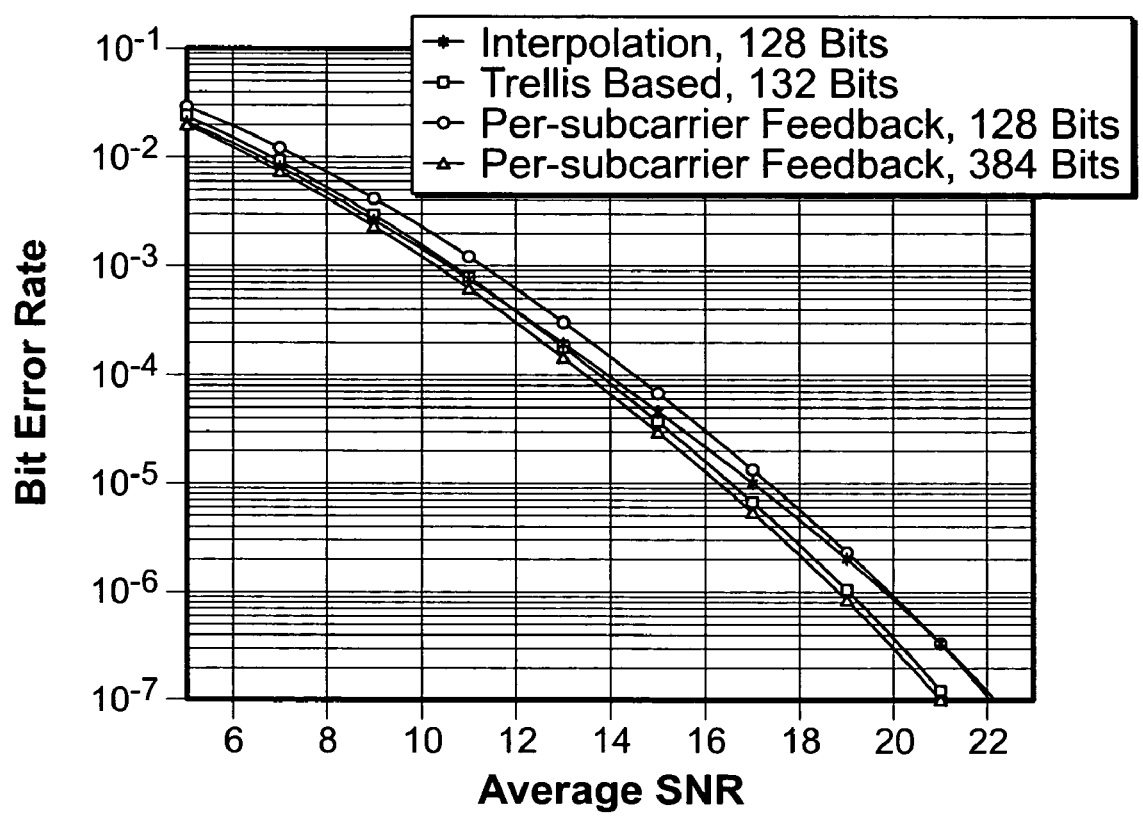
FIG. 12 is graph of bit error rates (BER) versus average signal-to-noise ratio (SNR), comparing the performance of precoded orthogonal space-time block codes (OSTBC) feedback for the per subcarrier method, the trellis method, and interpolation method.

FIGS. 10, 11 and 12 plot BER versus Average SNR for transmit beamforming, spatial multiplexing, and precoded, orthogonal, space-time block codes (OSTBC) per subcarrier feedback, respectively, comparing the trellis feedback reduction method to per-subcarrier feedback and the interpolation methods. In FIGS. 10 and 12, $N_t$ is set to 4 and $N_r$ is set to 1. In FIG. 11, $N_t$ is set to 4 and $N_r$ is set to 2, and $N_s$ is set to 2. Without feedback reduction, per-subcarrier feedback requires 384 bits when $B_1$=6 and 128 bits when $B_1$=2. The trellis method with $B_1$=6 and $B_2$=2 requires 132 bits. For the interpolation method, $N_g$=16 and P=8, resulting in 144 bits of feedback. As SNR increases in FIGS. 10 and 11, the BER curves of the interpolation-based method level off, indicating "diversity loss." Diversity loss leads to severe performance degradation at high SNR. The trellis-based method outperforms the interpolation-based method at high SNR, and outperforms per-subcarrier feedback by a constant amount (about 1.5 dB).

As demonstrated herein, the present invention overcomes the disadvantages and shortcomings of the prior art by providing a MIMO-OFDM system which employs a finite-rate feedback method utilizing vector quantization compression. The vector quantization compression techniques are effective in reducing feedback while maintaining performance at least in part because subchannel responses across OFDM subcarriers are correlated. As will be readily apparent to persons skilled in the art, the present invention has wide applicability and provides significant benefits to wireless communication systems.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

The invention claimed is:

1. A method for improving communications in a multiple input, multiple output orthogonal frequency division multiplexing (MIMO-OFDM) system, comprising the steps of:
   receiving a plurality of symbols from a plurality of sub-carriers at a receiver;
   selecting a plurality of indices of codewords corresponding to a codebook of pre-coding weighting matrices for the sub-carriers based on vector quantization compression of the codewords; and
   transmitting the selected indices over a wireless channel to a transmitter, wherein the transmitter is adapted to adjust future transmissions based upon the selected indices to improve communications between the transmitter and the receiver,
   wherein the step of selecting a plurality of indices based on vector quantization compression of the codewords further includes the step of selecting a plurality of indices based on trellis-based feedback encoding, including selecting optimal precoding matrices $T_i$ along a trellis for all possible paths at the same time for a predetermined number of subcarriers, $N_c$, each subcarrier having a designation p, p=0 to p=$N_c$−1.

2. The method of claim 1, wherein an optimal path through the trellis is chosen to minimize the average bit error rate.

3. The method of claim 2, wherein the optimal path through the trellis is found using the Viterbi algorithm.

4. A method for improving communications in a multiple input, multiple output orthogonal frequency division multiplexing (MIMO-OFDM) system, comprising the steps of:

receiving a plurality of symbols from a plurality of sub-carriers at a receiver;

selecting a plurality of indices of codewords corresponding to a codebook of pre-coding weighting matrices for the sub-carriers based on vector quantization compression of the codewords; and transmitting the selected indices over a wireless channel to a transmitter, wherein the transmitter is adapted to adjust future transmissions based upon the selected indices to improve communications between the transmitter and the receiver, wherein the step of selecting a plurality of indices based on vector quantization compression of the codewords further includes the step of selecting a plurality of indices based on trellis-based feedback encoding, including: (a) constructing a trellis by specifying a state transition table where each state is characterized by a precoding matrix $T_i$ chosen from a predetermined codebook T having $2^{B_1}$ states represented by $B_1$ bits.

5. The method of claim 4, wherein said step of selecting a plurality of indices based on trellis-based feedback encoding further includes the step of: (b) defining $2^{B_2}$ neighbor states from a reduced size codebook of $2^{B_2}$ codewords where and $B_2$ is less than $B_1$, said reduced size codebook including codewords that based on descending order of chordal distance relative to $T_i$.

6. The method of claim 5, wherein said step of selecting a plurality of indices based on trellis-based feedback encoding further includes the step of: (c) determining a branch metric from the previous state to the current state for all subcarriers.

7. The method of claim 6, wherein said step of selecting a plurality of indices based on trellis-based feedback encoding further includes the step of: (d) determining an optimal codeword from the codebook T represented by $B_1$ bits and the state of the p=0 subcarrier.

8. The method of claim 7, wherein the optimal codeword is determined based on finding an optimal precoding matrix $T^{opt}[p=0]$ where $T^{opt}[p=0]$ minimizes bit error rate, BER[p], at the p=0 subcarrier.

9. The method of claim 7, wherein said step of selecting a plurality of indices based on trellis-based feedback encoding further includes the step of: (e) incrementing the value of p to evaluate the next (p-th) subcarrier.

10. The method of claim 9, wherein said step of selecting a plurality of indices based on trellis-based feedback encoding further includes the step of: (f) executing one Viterbi step that only keeps the survivor paths from all possible states on the (p-1)-th subcarrier to all possible states on the p-th subcarrier.

11. The method of claim 10, wherein said step of selecting a plurality of indices based on trellis-based feedback encoding further includes the step of: (g) repeating steps (e)-(f) if the p-th subcarrier is not the last subcarrier ($N_c-1$).

12. The method of claim 11, wherein said step of selecting a plurality of indices based on trellis-based feedback encoding further includes the step of: (h) finding the optimal path along the trellis among all the survivor paths, the optimal path minimizing average bit error rate.

13. The method of claim 12, wherein said step of transmitting the selected indices over a wireless channel to the transmitter further includes the step of: (i) transmitting $B_1+(N_c-1)B_2$ bits corresponding to the selected indices over the wireless channel to the transmitter.

14. The method of claim 13, further including the steps of:
(j) receiving the $B_1+(N_c-1)B_2$ bits corresponding to the selected indices at the transmitter;
(k) specifying the optimal codewords for all subcarriers based on the selected indices;
(l) weighting a plurality of symbols by a precoding matrix $T^i$ based on the optimal codewords; and
(m) transmitting the weighted plurality of symbols to the receiver over the wireless channel.

15. The method of claim 14, wherein step (l) is based on one of per subcarrier beamforming, spatial multiplexing, and precoded orthogonal space-time block codes (STBC) weighting technique.

* * * * *